(12) United States Patent
Weidner et al.

(10) Patent No.: US 9,638,886 B1
(45) Date of Patent: May 2, 2017

(54) LENS ASSEMBLY WITH A LINEAR GUIDE SYSTEM

(71) Applicant: Fluke Corporation, Everett, WA (US)

(72) Inventors: William Weidner, Dublin, NH (US); Timothy Olsen, Milford, NH (US); Michael Loukusa, Buffalo, MN (US)

(73) Assignee: Fluke Corporation, Everett, WA (US)

(*) Notice: Subject to any disclaimer, the term of this patent is extended or adjusted under 35 U.S.C. 154(b) by 0 days.

(21) Appl. No.: 14/459,107

(22) Filed: Aug. 13, 2014

(51) Int. Cl.
| H04N 5/228 | (2006.01) |
| H01J 7/24 | (2006.01) |
| H01J 40/14 | (2006.01) |
| H01J 23/34 | (2006.01) |
| G02B 7/04 | (2006.01) |
| G02B 7/02 | (2006.01) |

(52) U.S. Cl.
CPC .............. *G02B 7/04* (2013.01); *G02B 7/021* (2013.01)

(58) Field of Classification Search
CPC ................................ G02B 7/04; G02B 7/021
USPC ............. 348/207.99, 373; 358/813; 396/529
See application file for complete search history.

(56) References Cited

U.S. PATENT DOCUMENTS

| 6,977,784 | B2 | 12/2005 | Sasaki | |
| 7,706,083 | B2* | 4/2010 | Saito | G02B 7/023 359/694 |
| 7,952,640 | B2* | 5/2011 | Yamamiya | G02B 7/09 250/238 |
| 8,564,715 | B2* | 10/2013 | Westerweck | G01D 5/3473 348/373 |
| 2013/0211199 | A1* | 8/2013 | Navok | A61B 1/0011 600/176 |
| 2013/0308212 | A1* | 11/2013 | Kubala | G02B 13/146 359/819 |
| 2015/0062409 | A1* | 3/2015 | Tsuzuki | G02B 7/102 348/342 |

* cited by examiner

*Primary Examiner* — Bumsuk Won
*Assistant Examiner* — Grant Gagnon
(74) *Attorney, Agent, or Firm* — Fredrickson & Byron, P.A.

(57) ABSTRACT

A lens assembly for a camera including a first lens mounted to a base portion, and a second lens mounted to a lens frame, where the first lens and the second lens are positioned co-axially along a central axis. The lens assembly includes a linear guide system for maintaining alignment of the first and second lenses. An embodiment of the linear guide system includes a first elongated element elongated along a longitudinal axis extending therethrough, parallel to and offset from the central axis. The elongated element may support and guide the lens frame for linear movement along a linear path parallel to the central axis. Some embodiments of the lens assembly include a second elongated element or rotation restriction element.

20 Claims, 7 Drawing Sheets

LENS ASSEMBLY WITH A LINEAR GUIDE SYSTEM

BACKGROUND

Lens assemblies for mounting guiding and focusing cameras are known in the art, including both mechanical and electromechanical arrangements. Mechanically focused cameras are often adjusted by rotating a focus ring on an objective. This rotation is mechanically converted into a displacement of a focusing lens within the camera, adjusting the focal point thereof. Cameras may also employ electromechanical means to displace a lens for focusing, including auto focus. Such cameras may use a servomotor to drive the lens in response to an input, such as a switch.

Conventional lens assemblies often use a "barrel in a barrel" type lens assembly for mounting the lenses and adjusting focus. The barrel in barrel lens assembly provides a means for adjusting the distance between two separate lenses within the lens assembly while maintaining alignment of the lenses with respect to one another. Barrel in barrel lens assemblies generally include a first lens mounted to a first cylinder (a first barrel), while a second lens is mounted to second cylinder (a second barrel). The two cylinders are mounted coaxially, one cylinder nested within the other cylinder, thus maintaining coaxial alignment as the two cylinders are rotated relative to one another and their lenses are moved with respect to one another along their common axis.

SUMMARY

Certain embodiments of the present invention relate generally to methods and devices for guiding and moving one or more lenses to focus the lens assembly of a camera.

Embodiments of the lens assembly for a camera to capture a target scene may include a base portion configured to secure the lens assembly to the camera, a first lens mounted to the base portion, and a second lens mounted to a lens frame. The first lens and the second lens may be positioned co-axially along a central axis extending through both the first lens and the second lens. The lens assembly may include a linear guide system for the first and second lens including a first elongated element and a second elongated element, each of the first elongated element and the second elongated element may be elongated along a longitudinal axis extending therethrough and parallel to and offset from the central axis. The lens frame may be supported by the first elongated element and the second elongated element, the first and second elongated elements supporting and guiding the lens frame for linear movement along a linear path parallel to the central axis, the linear movement along the linear path changing the distance between the first lens and the second lens to adjust the focus position of the lens assembly.

In another exemplary embodiment of the lens assembly, the lens assembly may include a base portion configured to secure the lens assembly to the camera, a first lens may be mounted to the base portion, and a second lens may be mounted to a lens frame. The first lens and the second lens may be positioned co-axially along a central axis extending through both the first lens and the second lens. A linear guide system for aligning the first lens with respect to the second lens and for guiding the first lens with respect to the second lens may include a first elongated element configured to support the lens frame and guide the lens frame for linear movement along a linear path parallel to the central axis, the first elongated element defining a first axis extending centrally therethrough located parallel to and offset from the central axis. The lens assembly may also include at least two bearings, the bearings supporting the first elongated element for sliding movement of the first elongated element within the bearings along the first axis, the linear movement along the linear path changing the distance between the first lens and the second lens to adjust the focus position of the lens assembly. The lens assembly may also include a rotation restriction element supported by the base portion that restricts rotation of the lens frame within the bearings and around the first axis.

In one or more embodiments of the lens assembly, the lens assembly may also include a motor that moves the second lens along the linear path to change the distance between the first lens and the second lens to adjust the focus position of the lens assembly. The lens assembly may also include a range determining device configured to determine the distance between the lens assembly and the target scene, and a position sensor configured to determine the position of the second lens relative to the first lens. The position sensor may include a movable element and a reference element. At least one of the movable element and the reference element may be fixedly coupled to the base portion, and the other of the movable element and the reference element may be fixedly coupled to the first or second elongated element. The lens assembly may further include a processor configured to provide feedback to the motor to adjust the position of the second lens based on the position sensed by the position sensor.

The lens assembly described in this disclosure includes a lens mounting and linear guide system having decreased surface area between components, and therefore, reduced frictional loses in the lens assembly. The lens assembly described herein permits lower power motors to be used than can be accomplished using conventional lens assemblies. The lens assembly described herein also may include a shield which surrounds at least a portion of the lens. The shield prevents stray thermal energy from the camera cavity from landing on the focal plane. Benefits of the present disclosure include lower power consumption by the motor, extended battery life, and reduced weight.

Certain embodiments of the present invention are described in the following numbered illustrative embodiments.

1. A lens assembly for a camera to capture information about a target scene, the lens assembly comprising:
   a base portion configured to secure the lens assembly to the camera;
   a first lens mounted to the base portion;
   a lens frame;
   a second lens mounted to the lens frame;
   the first lens and the second lens positioned co-axially along a central axis extending through both the first lens and the second lens;
   a linear guide system comprising:
      a first elongated element and a second elongated element, each of the first elongated element and the second elongated element having a longitudinal axis parallel to and offset from the central axis;
      the lens frame supported by the first elongated element and the second elongated element, wherein the first and second elongated elements support the lens frame for linear movement along a linear path parallel to the central axis;

a motor that moves the second lens along the linear path to change the distance between the first lens and the second lens to adjust the focus position of the lens assembly;

a range determining device configured to determine the distance between the lens assembly and the target scene;

a position sensor configured to determine the position of the second lens relative to the first lens comprising a movable element and a reference element, at least one of the movable element and the reference element is fixedly coupled to the base portion, and the other of the movable element and the reference element is fixedly coupled to the first or second elongated element;

a processor configured to provide feedback to the motor to adjust the position of the second lens based on the position sensed by the position sensor.

2. The lens assembly of embodiment 1 or any preceding embodiment, wherein the motor is coupled to at least one of the first or second elongated elements by frictional engagement.

3. The lens assembly of embodiment 2 or any preceding embodiment, wherein the frictional engagement between the motor and the first or second elongated elements occurs via an engagement finger, and wherein the engagement finger applies a force in a direction intersects the longitudinal axis of the first or second elongated elements.

4. The lens assembly of embodiment 3 or any preceding embodiment, wherein the engagement finger travels along a generally elliptical path in a plane that intersects the longitudinal axis of the first or second elongated elements.

5. The lens assembly of embodiment 1 or any preceding embodiment, wherein the one of the first and second elongated elements is supported for linear movement along the linear path by linear bearings.

6. The lens assembly of embodiment 5 or any preceding embodiment, wherein at least one of the linear bearings is coupled to the base portion, the at least one bearing is in contact with the first elongated element, further wherein the motor is coupled to the first elongated element by frictional engagement, and the motor is coupled to the first elongated element such that a force is applied to the first elongated element in a direction perpendicular to the central axis to preload the at least one bearing.

7. The lens assembly of embodiment 5 or any preceding embodiment, wherein the at least one bearing is coupled to the base portion, the at least one bearing configured to contact the first elongated element, wherein the contact between the at least one bearing and the first elongated element is in the form of a line contact along a line substantially parallel to the central axis.

8. The lens assembly of embodiment 1 or any preceding embodiment, wherein the motor is a piezo motor.

9. The lens assembly of any of the preceding embodiment, wherein the motor is frictionally engaged with the first elongated element, and wherein the frictional engagement between the motor and the first elongated element preloads the first elongated element such that the contact between the linear bearings and the first elongated element is in the form of a line contact along a line substantially parallel to the first axis.

The details of one or more examples and embodiments of the invention are set forth in the accompanying drawings and the description below. Other features, objects and advantages will be apparent from the description and the drawings, as well as from the claims of the invention.

DETAILED DESCRIPTION

Figure 1B:
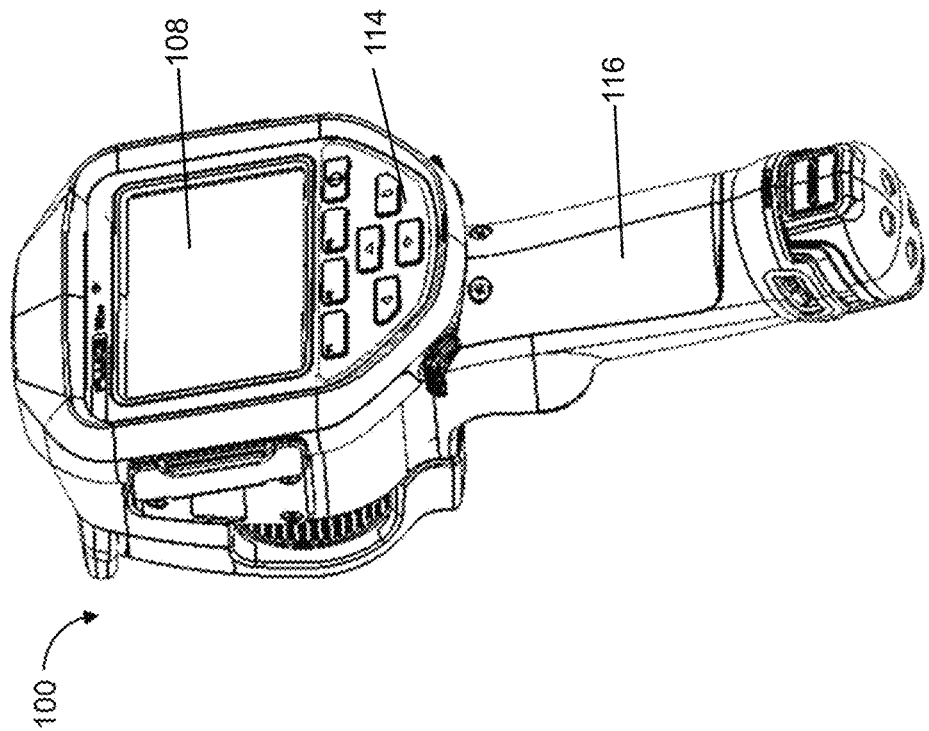
FIG. 1b is a rear perspective view of an embodiment of a thermal imaging camera.

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives. In the following description, where applicable, like reference numbers will be used for like components. It should be appreciated that components of the invention may vary among embodiments of the invention while remaining functionally similar. In such cases, like reference numbers may also be used.

Various embodiments described herein include assemblies, systems and methods for a lens assembly for a camera, including features related to focusing the lens assembly of the camera. The lens assembly focuses on a target scene by guided relative motion between two or more lenses aligned along a central axis. The lens assembly described in this disclosure includes a linear guide system having reduced surface area of the guide components. The reduction in surface area leads to reduced frictional loses in the lens assembly, thus permitting lower power motors to be used than can be accomplished using conventional lens assemblies. The lens assembly described herein is described with respect to the example of a thermal imaging camera. However, the lens assembly may also be used in other types of cameras and is not limited to thermal imaging cameras.

The present disclosure enables a lens of a multi-lens lens assembly to be moved for focusing using a miniature, lower power motor (e.g., actuator) that radiates minimal heat into the enclosed camera space. A lower power motor that would not be suitable for use in conventional lens assemblies can be used in the present disclosure because the linear guide system that provides alignment to the lens during focusing is extremely light weight, and operates with very low friction. Essentially, the lens assembly prevents unwanted motions with minimal friction.

The lens assembly described herein also allows the lens to be surrounded by a shield that prevents stray thermal energy from the camera cavity from landing on the focal plane. Benefits of the present disclosure include lower power consumption by the motor, extended battery life, and reduced weight.

A thermal imaging camera may be used to detect heat patterns across a scene under observation. The thermal imaging camera may detect infrared radiation given off by the scene and convert the infrared radiation into an infrared image indicative of the heat patterns. In some examples, the thermal imaging camera may also capture visible light from the scene and convert the visible light into a visible light image. Depending on the configuration of the thermal imaging camera, the camera may include infrared optics to focus the infrared radiation on an infrared sensor or focal plane array and/or a visible light optics to focus the visible light on a visible light sensor or focal plane array. In general, a light sensor may refer to a visible light or an infrared sensor.

Figure 1A:
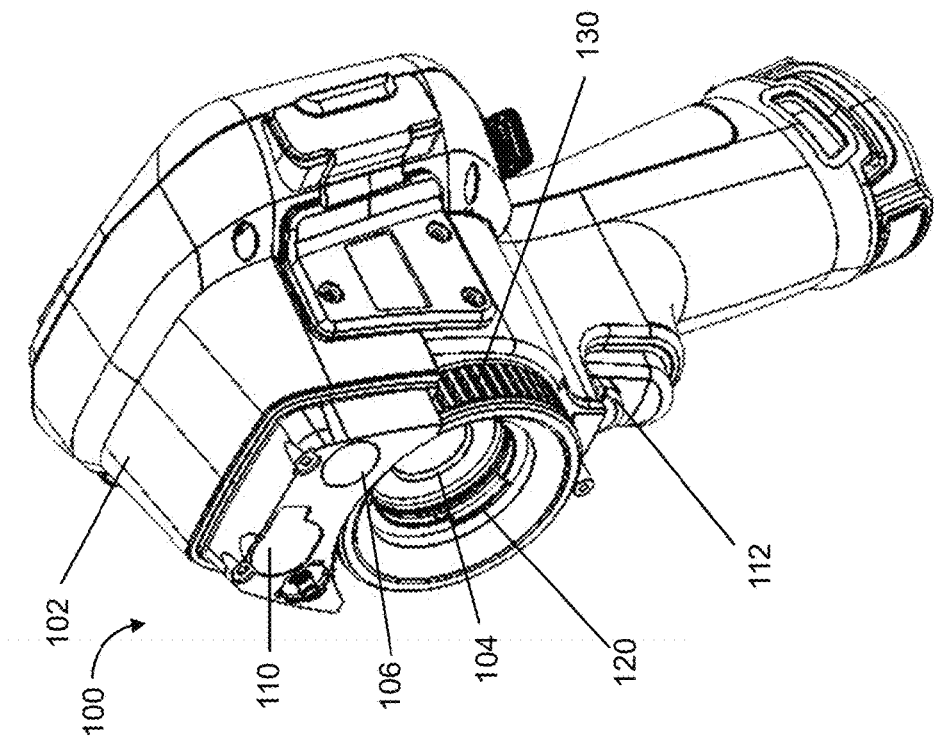
FIG. 1a is a front perspective view of an embodiment of a thermal imaging camera.

FIGS. 1a and 1b show front and rear perspective views of an example thermal imaging camera 100, respectively. The camera comprises a housing 102, an infrared lens assembly 104, a visible light lens assembly 106, a display 108, a range determining device 110 (e.g., laser or optical range finder), and a trigger control 112. Housing 102 houses the various components of thermal imaging camera 100. The bottom portion of thermal imaging camera 100 includes a carrying handle 116 for holding and operating the camera via one hand. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. The visible light and/or infrared sensors, as well as elements of the infrared and/or visible light lens assemblies, may be positionable in order to adjust the focal plane of the corresponding radiation. The camera 100 may comprise a motor configured to position a focusing device such as a lens. In alternative embodiments, the motor may instead be configured to position the light sensor or focal plane array in addition or alternatively to moving the lens. In certain embodiments, the motor may comprise a servo motor, a piezoelectric motor, or others known in the art.

Thermal imaging camera 100 captures the visible light image and/or the infrared image in response to depressing trigger control 112. In addition, thermal imaging camera 100 controls a display to display the infrared image and the visible light image generated by the camera, e.g., to help an operator thermally inspect a scene. Thermal imaging camera 100 may have both autofocus and manual focus, and may include a focus wheel assembly 130 coupled to the infrared lens assembly 104 that is configured to move at least one lens of the infrared lens assembly so as to manually to adjust the focus of an infrared image generated by the thermal imaging camera 100. A user interface 114 may also be included to allow the user to select or adjust parameters or interact with the camera in other ways. An accessory lens mount 120 may be provided to mount other accessories to the thermal imaging camera 100.

Figure 2:
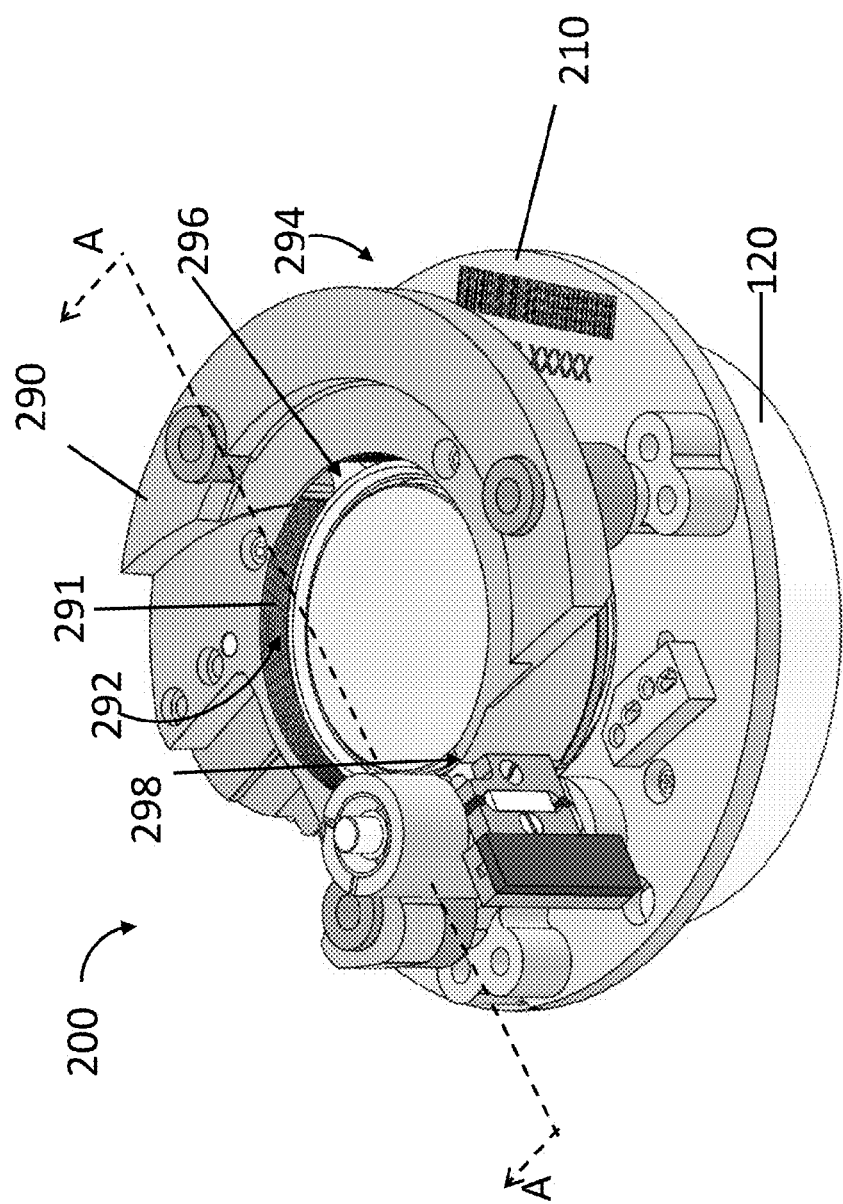
FIG. 2 is a perspective view of an embodiment of a lens assembly of thermal imaging camera of FIGS. 1a and 1b.

Lens assembly 200, which may comprise infrared lens assembly 104 or visible light lens assembly 106, provides lens mounting, guidance and lens moving capabilities for the thermal imaging camera 100. An exemplary embodiment of the lens assembly 200 will be described with reference to FIGS. 2-7. FIG. 2 is an overall perspective view of portions of an embodiment of the lens assembly 200, including a base portion 210, a shield 290, and the accessory lens mount 120. As shown in FIG. 2, the base portion 210 of lens assembly 200 provides the support and mounting surfaces for attaching other components of the lens assembly 200, such as accessory lenses. The accessory lens mount 120 and shield 290, and some of other components in FIG. 2 will be described in further detail following the description of other components of the lens assembly 200.

Figure 3:
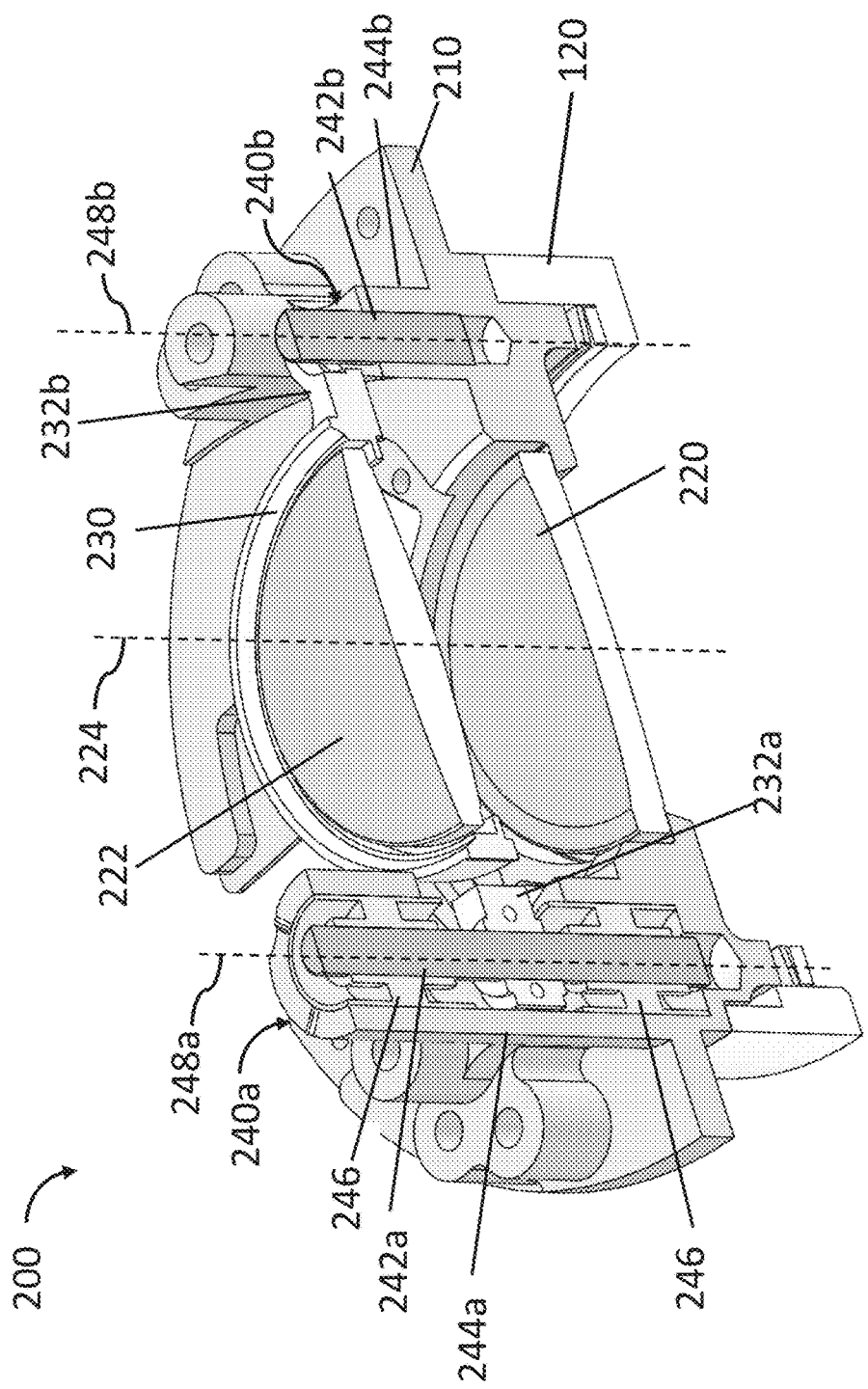
FIG. 3 is a cross sectional perspective view of the lens assembly of FIG. 2 taken along line A-A, with the shield removed.

FIG. 3 is a perspective view of a cross section through portions of the exemplary embodiment of the lens assembly 200 of FIG. 2, taken along line A-A, with the shield 290 of FIG. 2 removed. As shown in the exemplary embodiment of FIG. 3 (supported by all of FIGS. 2-7 as a whole), the lens assembly 200 may further include a first lens 220 mounted to the base portion 210, and a second lens 222 mounted to a lens frame 230. The first lens 220 and the second lens 222 may be positioned co-axially along a central axis 224 extending through both the first lens 220 and the second lens 222. A linear guide system formed by one or more of a first linear guide system portion 240a, and a second linear guide system portion 240b, may be provided for maintaining alignment of the first lens 220 and the second lens 222 as the distance between the first lens and the second lens is adjusted during focusing. The first linear guide system portion 240a may include a first elongated element 242a, and the second linear guide system portion 24b may include a second elongated element 242b. Each of the first elongated element 242a and the second elongated element 242b may be described as being elongated along a longitudinal axis (a first axis 248a, and a second axis 248b, respectively) each longitudinal axis being parallel to and offset from the central axis 224. The first and second elongated elements 242a, 242b may be located opposite on another (e.g., 180 degrees apart with respect to the center of the second lens 222). However, any suitable arrangement around the second lens 222 may also be used, such as 45 degrees apart, 60 degrees apart, 90 degrees apart, 120 degrees apart, or 150 degrees apart.

In the exemplary embodiment of FIGS. 2-7, the first linear guide system portion 240a may further include a first elongated element support 244a, and the second linear guide system portion 240b may further include a second elongated element support 244b. The motion of the first and second elongated elements 242a and 242b may be restricted by the first and second elongated element supports 244a and 244b, respectively. The first and second elongated element supports 244a, 244b may be in the form of a tower, pillar, and/or rod. The first elongated element support 244a has a longitudinal axis that is coaxial (e.g., coaxial, substantially coaxial, generally coaxial) with the longitudinal axis of the first elongated element 242a (first axis 248a). The second elongated element support 244b has a longitudinal axis that is co-axial with the longitudinal axis of the second elongated element 242b (second axis 248b). Each of the first and second elongated element supports 244a, 244b may extend away from a surface of the base portion 210. In other embodiments, the restrictive support function of the second elongated element support 244b may be flush or recessed within the base portion 210 and still provide restrictive support to the first and second elongated elements 242a, 242b.

In the exemplary embodiment of FIGS. 2-7, the first linear guide system portion 240a may further include one or more bearings 246. The motion of the first elongated element 242a may be restricted and supported by both the first elongated element support 244a in conjunction with the one or more bearings 246. The one or more bearings 246 may be linear bearings or any other suitable type of bearing. In one exemplary embodiment, the first elongated element 242a is slidingly coupled to the first elongated element support 244a via the one or more bearings 246, where the one or more bearings 246 are fixedly mounted to the first elongated element support 244a. In other embodiments, bearings 246 may also be included to support the second elongated element 242b for linear movement along the linear path.

In the exemplary embodiment of FIGS. 2-7, the motion of the second elongated element 242b may be restricted by the second elongated element support 244b formed in or coupled to the base portion 210. The second elongated element 242b may be fixedly coupled to second elongated element support 244b. In other embodiments, the second elongated element 242b may be slidingly coupled to the second elongated element support 244b and the second linear guide system portion 240b may include bearings 246.

Figure 6:
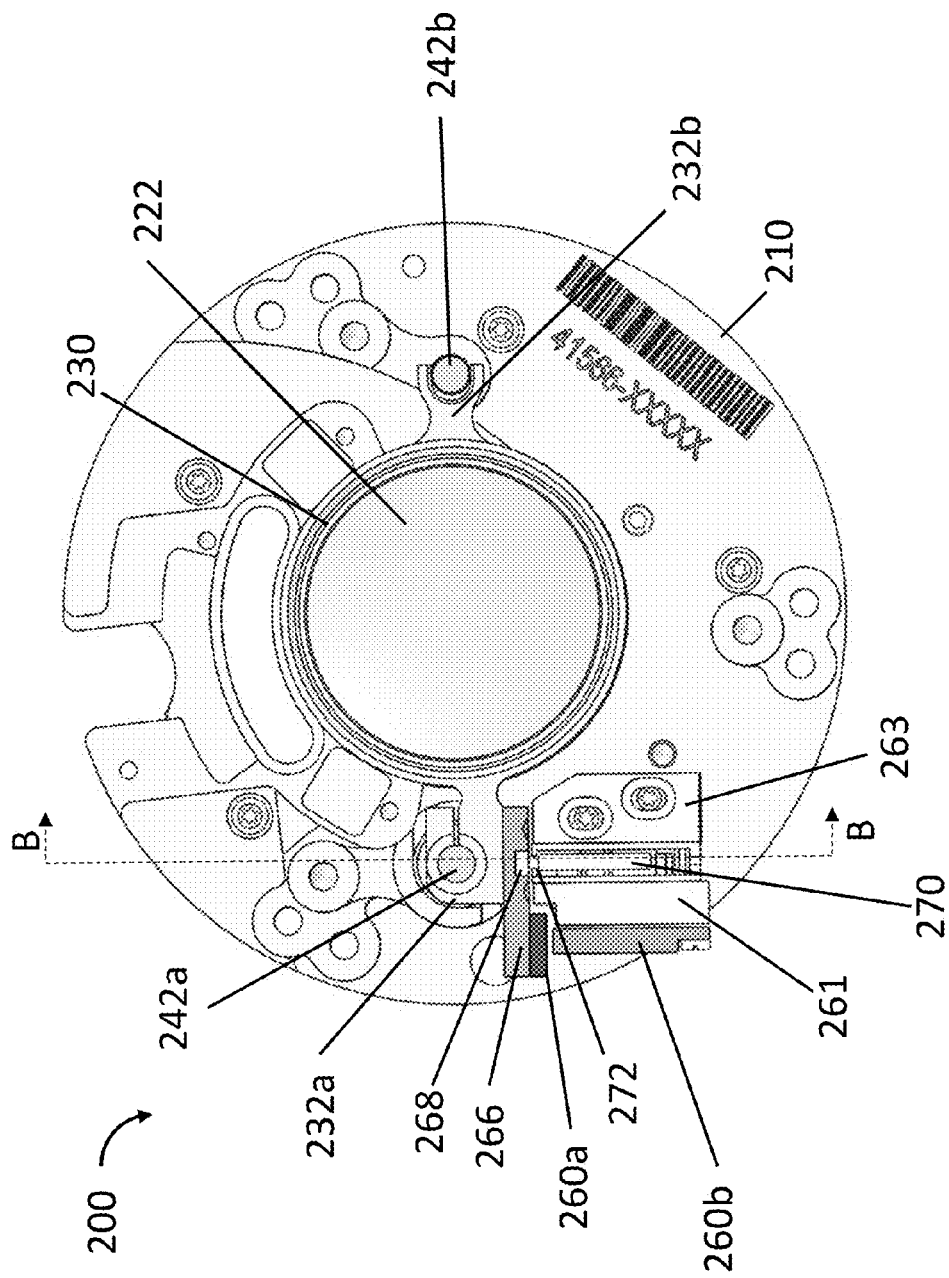
FIG. 6 is a top view of the lens assembly of FIG. 2 with some components removed, similar to FIG. 4.

As shown in FIG. 3, and further shown in the top view of FIG. 6, the lens frame 230 may include a first engagement feature 232a for coupling the second lens 222 to the first elongated element 242a, and a second engagement feature 232b for coupling the second lens 222 to the second elongated element 242b. The first and second engagement features 232a, 232b include engagement features that provide support to the lens frame 230 from the first and second elongated elements 242a, 242b. For example, the first and second elongated elements 242a, 242b may provide support and guidance to the lens frame 230 for linear movement along a linear path parallel to the central axis 224. In one exemplary embodiment, and as shown in FIGS. 3 and 6, the lens frame 230 may be fixedly coupled to the first elongated element 242a via the first engagement feature 232a, and slidingly engaged with the second elongated element 242b via second engagement feature 232b. Such an arrangement provides for sliding movement of the lens frame 230 and second lens 222 in the direction of the linear path.

The linear guide system of the exemplary embodiment of FIG. 2-7, with particular reference to FIG. 3 will now be described in further detail including particular features of the exemplary embodiment. The first linear guide system portion 240a may include the first elongated element support 244a, one or more bearings 246, and the first elongated element 242a. The first elongated element support 244a may be formed by the base portion 210 and may be elongated in the direction of the linear path. The one or more bearings 246 may be linear bearings that are supported by, and in some embodiments, be fixedly attached to the base portion 210 via the first elongated element support 244a. The one or more bearings 246 may be linear bearings, as described, or they may be any other suitable type of bearing. The first elongated element 242a may be in sliding engagement with the internal diameter of the one or more bearings 246. The one or more bearings 246 may provide the first elongated element 242a support for linear movement in the direction of the linear path. In the exemplary embodiment the lens frame 230 is fixedly connected to the first elongated element 242a via the first engagement feature 232a, such as a clamp, or any other suitable feature for fixed connection that may be incorporated into the lens frame 230. The first engagement feature 232a may surround at least a portion of the first elongated element 242a maintaining the lens frame 230 in a fixed relationship with first elongated element 242a. Any other suitable attachment method may be used to couple lens frame 230 and first elongated element 242a, including but not limited to, adhesive, vibration welding, screws, snap-fit, etc. The fixed connection between the lens frame 230 and the first elongated element may be located between two of the one or more bearings 246. For example, the bearings 246 supporting the first elongated element 242a may include at least two bearings 246 that support the first elongated element 242a for sliding movement of the first elongated element 242a within the bearings 246 along the first axis 248a (e.g., longitudinal axis of the first elongated element 242a). The bearings 246 may be coupled to the base portion 210 and may be spaced apart along the first axis 248a. The lens frame 230 may be coupled to the first elongated element 242a at a location on the first elongated element 242a between the at least two bearings 246. In other words, a bearing 246 may be located above, and a bearing 246 may be located below, the first engagement feature 232a along the first axis 248a.

Opposite the first linear guide system portion 240a may be the second linear guide system portion 240b. The second linear guide system portion 240b may include the second elongated element support 244b and the second elongated element 242b. As shown with particular reference to FIG. 3, the second elongated element 242b may be fixedly attached to the second elongated element support 244b (e.g., by a press fit, threads, adhesive, vibration welding, integral molding, or any other suitable means). In addition, the lens frame 230 may be slidingly engaged (e.g., coupled, connected) to the second elongated element 242b. This sliding engagement may be provided by a second engagement feature 232b, such as a semi-circular fork that may be incorporated into the lens frame 230. The second engagement feature 232b may surround at least a portion of the second elongated element 242b maintaining the second engagement feature 232b of the lens frame 230 in a sliding relationship with second elongated element 242b. Any other suitable attachment method may be used to couple lens frame 230 and second elongated element 242b, including but not limited to, a pin on the lens frame 230 which extends into a slotted recess or aperture in the second elongated element, or an engagement feature that entirely surrounds the second elongated element 242b, etc.

The linear guide system 240a, 240b of the exemplary embodiment is provided for clarity and brevity and is described herein as being formed from a first linear guide system portion 240a including a fixed connection to the lens frame 230, and second linear guide system portion 240b including a sliding connection to the lens frame 230. However, in other embodiments, any suitable number of linear guide system portions (e.g., 1, 2, 3, 4, or more), including fixed and/or sliding connections to one or more lens frames may be utilized and still fall within the scope of this disclosure. Linear guide systems of the present disclosure may further include one linear guide system portion, two linear guide system portions, or more than two linear guide system portions. Each linear guide system portion may include variations of the fixed and sliding characteristics described herein.

In some embodiments, the linear guide system 240a, 240b for the first and second lenses 220, 222 may include a first elongated element 242a configured to support the lens frame 230 and guide the lens frame 230 for linear movement along a linear path parallel to the central axis 224, without necessarily including a second elongated element 242b arranged as previously described. In some embodiments, movement of the first elongated element 242a may be restricted by a rotation restriction element, or a pair of complimentary rotation restriction elements, to restrict rotation of the lens frame 230 around the first axis 248a. Thus maintaining alignment of the second lens 222 with respect to the first lens 220. Any suitable rotation restriction element(s) could be used via incorporation into components of the system such as the base portion 210, the first elongated element 242a, the first elongated element support 244a, or the bearings 246.

In addition to the exemplary embodiment described, some other embodiments may include the lens frame 230 being supported by one or more of the first and second elongated elements 242a, 242b by any combination of fixed connections or sliding engagements between the lens frame 230 and the first and/or second elongated elements 242a, 242b that provides for sliding movement in the direction of the linear path. As shown in the embodiment of FIGS. 2-7, the lens frame 230 may be supported by first and second elongated elements 242a, 242b that are located on substantially opposite sides of the second lens 222 (approximately 180 degrees apart with respect to the center of the lens). However, in other embodiments the first and second elongated elements 242a and 242b may be located 45 degrees apart, 60 degrees apart, 90 degrees apart or 120 degrees apart, etc., or any other suitable angle. Furthermore, any number of elongated elements may be provided to support the second lens 222, including 1, 2, 3, or 4, etc. elongated elements.

In addition to the exemplary embodiment described, in some embodiments, other combinations or arrangements of fixed and/or sliding connections for supporting lens frame 230 via first and second elongated elements 242a and/or 242b, such that first and second elongated elements 242a and/or 242b provide support and guidance during a change in the distance between the first lens 220 and the second 222 is considered to be within the scope of this disclosure.

For example, in some embodiments either of the first elongated element 242a and/or the second elongated element 242b may or may not be in fixed connection to the lens frame 230, and either of the first elongated element 242a and/or the second elongated element 242b may or may not be in sliding engagement to the lens frame 230. Portions of the linear guide system may be provided in any number, with any combination of the disclosed features such that sliding of lens frame 230 along the linear path is enabled and unwanted motion is sufficiently minimized.

Figure 4:
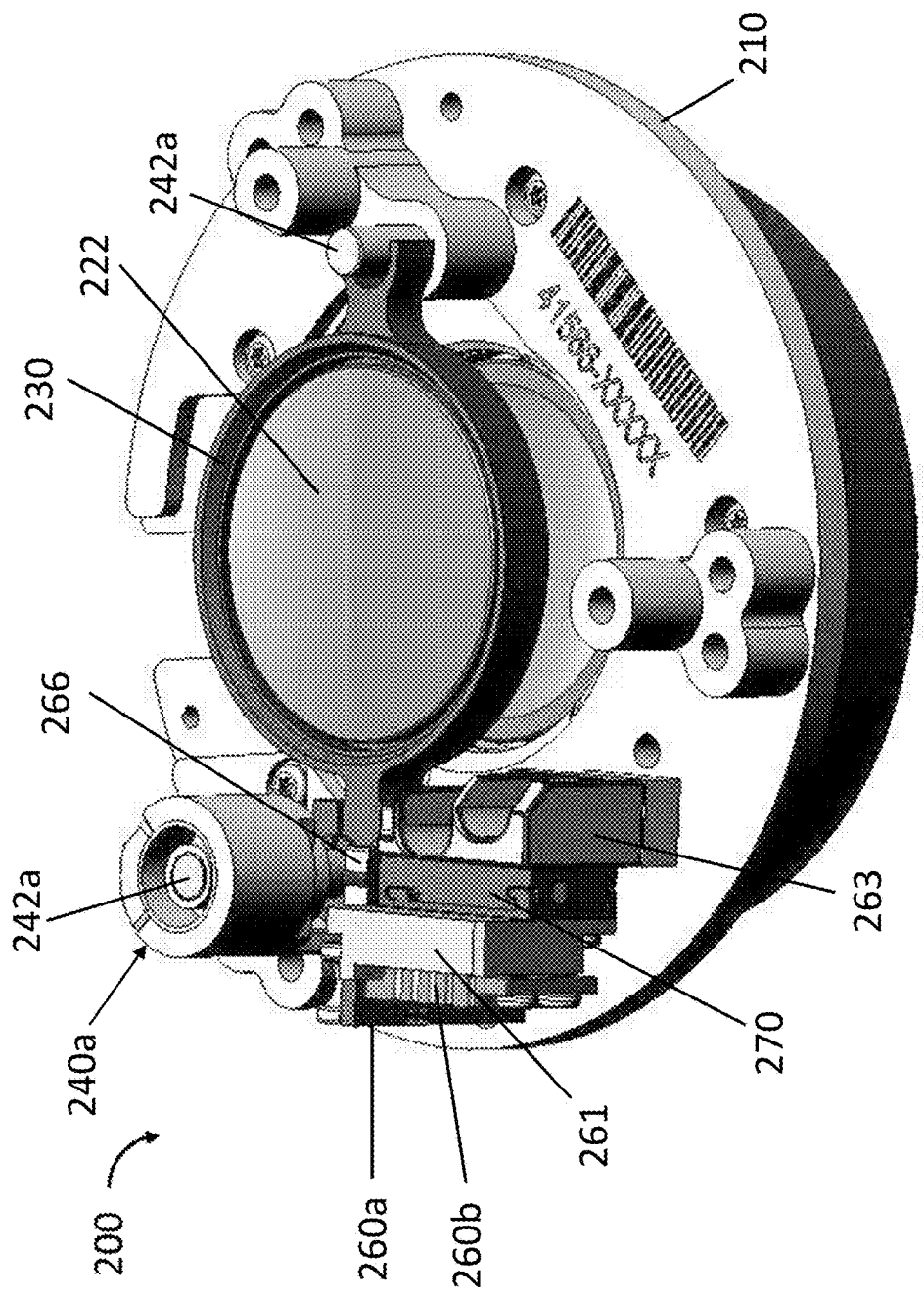
FIG. 4 is a perspective view of the lens assembly of FIG. 2 with some components removed.
Figure 7:
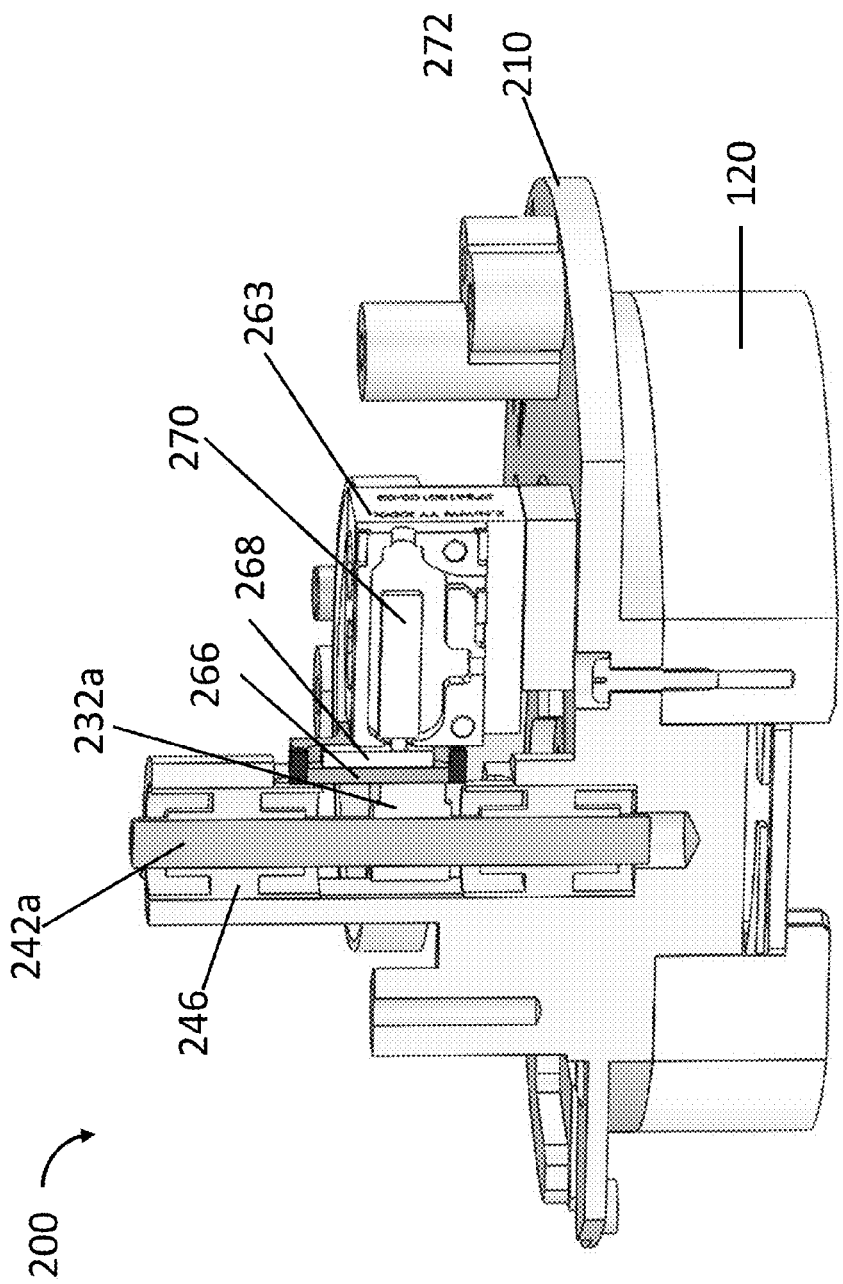
FIG. 7 is a cross sectional side view of the lens assembly of FIG. 1 with some components removed, as taken along line B-B in FIG. 6.

An exemplary embodiment of the components which provide the motive force to move the second lens 222 with respect to the first lens 220 of FIGS. 2-7, will be described with particular reference to FIGS. 4-7. A motor 270 (as shown in FIGS. 4, 6 and 7) may be coupled to the second lens 222 to provide a motive force to the second lens 222 to move the second lens 222 along the linear path to change the distance between the first lens 220 and the second lens 222, thus adjusting the focus position of the lens assembly 200. Various types of motors may be used in the lens assembly 200. However, the present lens assembly 200 as described herein leads to a significant reduction in the frictional losses over conventional systems, and therefore a lower power motor, such as a piezo motor or any other suitable low power motor, may be used as compared with conventional systems. The reduction in frictional losses is due, at least in part, to a reduction in surface area of the linear guide system. Conventional guidance systems, such as barrel in barrel systems include more surface area between the components that slide relative to one another. This reduction is surface area of sliding components results in system that can be used with a motor 270 that has significantly less power than is achievable with conventional systems. Motors suitable for use in this system include any micro linear actuator, such as a piezo motor. The power of the motor 270 may be less than 0.5 Watts in the case of a piezo motor. In some embodiments, the power of the motor 270 may be in the range of 0.5-1.0 Watts.

As shown in the exemplary embodiment of FIGS. 4-7, the motor 270 may be attached to base portion 210 via mounts, 261 and 263. The motor 270 may also be coupled to the first elongated element 242a via one or more components including an engagement finger 272 of motor 270. In the exemplary embodiment described, the motor is described as being coupled to only the first elongated element 242a. However, in some embodiments, the motor may be coupled to multiple elongate elements, including either the first elongated element 242a and/or the second elongated element 242b, or additional elongate elements.

The engagement finger 272, which extends from motor 270, applies a normal force to engagement plate 268. The normal force applied by the engagement finger 272 on the engagement plate 268 results in frictional engagement between the engagement finger 272 and the engagement plate 268. The motor 270 may actuate the engagement finger 272 such that the engagement finger 272 applies a force in a direction that intersects the first axis 248a (e.g., longitudinal axis of the first elongated element 242a). The motor 270 may actuate the engagement finger 272 such that the engagement finger 272 travels along an elliptical path (e.g., elliptical, generally elliptical, substantially elliptical). The elliptical path may be in a plane that intersects the first axis 248a of the first elongated element 242a. In other words, the engagement finger 272 may travel not only up and down along the first axis 248a, but also towards and away from the engagement plate 268. The engagement finger 272 may travel along a defined path, and the engagement finger 272 movements may be tiny micro-movements that are repeated multiple times to complete one desired movement of the second lens 222.

Figure 5:
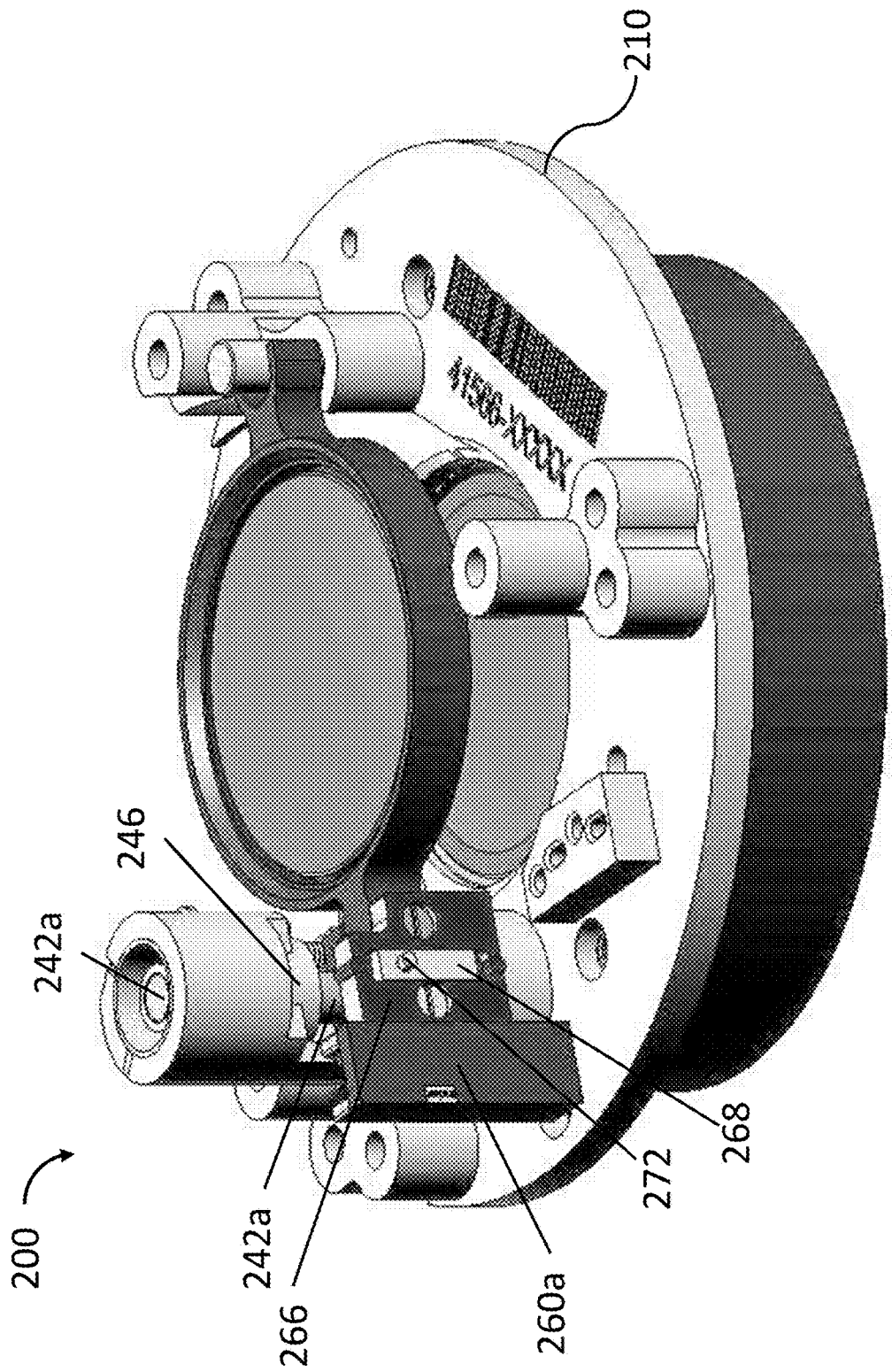
FIG. 5 is another perspective view of the lens assembly of FIG. 2, with additional components removed as compared to FIG. 4.

As shown in the cross-section top view of FIG. 6, the engagement finger 272 may extend outward from motor 270 towards the direction of the first elongated element 242a. For the purposes of clarity, engagement finger 272 is depicted in FIG. 5, as it would be in engagement with the engagement plate 268, with the rest of the motor 270 removed. The engagement plate 268 may be mounted to the translating mounting block 266, and the translating mounting blocking 266 may be coupled to the lens frame 230 via the first engagement feature 232a. In some embodiments, all of the engagement plate 268, the translating mounting block 266, the first engagement feature 232a of the lens frame 230, and the first elongated element 242a are coupled in fixed connections to one another and move together upon actuation of the motor 270.

The normal force applied by the engagement finger 272 to the engagement plate 268 may results in a pre-loading of the one or more bearings 246. Pre-loading of the one or more bearings 246 may occur when one or more bearings 246 are fixedly coupled to the base portion 210, and the one or more bearings 246 are in sliding contact with the first elongated element 242a, and the engagement finger 272 is transferring a normal force to the first elongated element 242a. The normal force applied to the first elongated element 242a causes the elongate element to shift within the internal diameter of the one or more bearings 246, thus making contact with the surface of the internal diameter of the one or more bearings 246 that is most distal from the engagement finger 272. In other words, the motor 270 is coupled to the first elongated element 242a via engagement finger 272 such that a normal force is applied to the first elongated element 242a in a direction that intersects the first axis 248a to preload one or more bearings 246. For example, the first elongated element 242a reacts to the normal force and shifts within the available tolerance of the bearings 246. In embodiments including this arrangement, the contact between the one or more bearings 246 and the first elongated element 242a may be in the form of a line contact along a line substantially parallel to the first axis 248a. Furthermore, the line contact may be located on the surface of the internal diameter of the one or more bearings 246 that is most distal from the engagement finger 272.

The exemplary embodiment of the lens assembly 200 may include a feedback system to control the position and movement of the second lens 222. Components of the feedback system may include the range determining device 110 (See, FIG. 1a), a position sensor (See, 260a, 260b of FIG. 6), and a processor (e.g., may be included in or mounted to a portion of the position sensor 260b), in cooperation with other components of the lens assembly 200, including the motor 270.

When the processor initiates movement of the second lens 222 with respect to the first lens 220, the engagement finger 272 may be moved by the motor 270 which causes the engagement plate 268, the translating mounting block 266, the first engagement feature 232a, and the first elongated element 242a to move up and down along the linear path.

The range determining device 110 may be configured to determine the distance between the lens assembly 200 and the target scene. For example, the range determining device 110 may be a laser range finder. A laser range finder may determine the distance from the camera 100 to the target scene by measuring the time that elapses between the time a laser on the camera 100 is impinged on a target scene and when the laser is reflected back to the range determining device 110. Any other suitable method for determining range may also be used.

The position sensor 260a, 260b may determine the relative distance between the first lens 220 and the second lens 222. In one or more embodiments the position sensor 260a, 260b may be in the form of a magnetic encoder. In an exemplary embodiment, the magnetic encoder may include a magnet 260a and an encoder 260b configured to read magnetic signals. In some embodiments the magnet 260a may be mounted in fixed connection to the translating mounting block 266, and the encoder 260b may be mounted in fixed connection to the base portion 210 and the motor 270 via mount 261. In some embodiments, the position sensor 260a, 260b may also include an optical sensor and optical indicator. The position sensor 260a, 260b may be any system suitable to determine the relative distance between the first lens 220 and the second lens 222.

The processor may be incorporated into, or operatively coupled to the encoder 260b of the position sensor 260a, 260b. The processor may be configured to provide feedback to the motor 270 to adjust the position of the second lens 222 based on the position sensed by the position sensor 260a, 260b and the distance measured between the camera 100 and the target scene by the range determining device 110. The processor determines the appropriate distance between the first lens 220 and second lens 222 based on the distance measured by the range determining device 110 to focus on the target scene. The processor may then communicate information to the motor 270 to adjust the distance via a motive input from the motor 270 to the linear guide system 240a, 240b to change the position of the second lens 222.

Cameras, including thermal imaging cameras, may include both an auto focus mode and a manual focus mode. In accordance with the present invention, and as described, camera 100 may include an auto focus mode relying on the range determining device 110. The camera may use this information to drive the lens or the light sensor to an appropriate focusing location based upon the determined distance. Because of the non-physical connection between the focus wheel assembly and the lens or light sensor, the motor may drive one or both of these components in the auto focus mode, without rotating the focusing wheel of the assembly which enables the manual focus mode. Similarly, rotating the focusing wheel while in auto focus mode may not move either of these components. Accordingly, in some embodiments, there is no one-to-one correspondence between the position of the focusing wheel and the position of the lens or light sensor. This physical decoupling of the focusing wheel position and the light sensor advantageously allows a user to seamlessly transition between auto focus mode and manual focus mode at any point during operation.

With regard to the previously described accessory lens mount 120 shown in FIG. 2. The accessory lens mount 120 is the outermost portion of the lens assembly closest to the target scene to be captured. The accessory lens mount 120 provides a mounting surface for mounting other accessory lenses to the camera. The accessory lens mount 120 may be any suitable mount, such as a bayonet mount.

With regard to the previously described shield 290 shown in FIG. 2, the shield 290 may be located distal from the accessory lens mount 120, with the first lens 220 and the second lens 222 being located in between the accessory lens mount 120 and the shield 290. The shield 290 may include a first surface 292 opposite a second surface 294 with a shield thickness defined therebetween. A first aperture 296 may extend through the shield from the first surface 292 to the second surface 294, and a second aperture 298 may extend through the shield 290 from the first surface 292 to the second surface 294. As shown in FIG. 2, and with additional reference to the lens frame 230 in FIG. 6, the first engagement feature 232a of the lens frame 230 may extend through the first aperture 296 in the shield 290. Correspondingly, the second engagement feature 232b of the lens frame 230 may extend through the second aperture 298 in the shield 290. The first and second apertures 296, 298 may formed such that each of the first and second engagement features 232a, 232b may each travel within their respective first and second apertures 296, 298 along paths parallel to the central axis 224, and may do so under a force applied by the motor 270.

The first surface 292 of the shield 290 may surround at least a portion of the second lens 222. The shield 290 may prevent stray thermal energy from the camera cavity, such as thermal energy radiated by the motor 270, from landing on the focal plane behind (e.g., more distal from the accessory lens mount 120) the second lens 222. The shield 290 may absorb rather than reflect unwanted out-of-field stray energy. Stray radiation energy sources may include heat radiated by the motor 270. The absorption of stray radiation energy improves the image quality generated by the camera 100. At least a portion of the shield 290, such as first surface 292 may include geometric features 291 that absorb stray radiation energy. The geometric features 291 may include any feature configured to absorb stray radiation energy, including but not limited to grooves, including helical or ring-like grooves, or any other surface texture that is suitable for absorbing energy.

Example thermal image cameras and related techniques have been described. Certain techniques, including the feedback system for the auto focus mode described in this disclosure may also be embodied or encoded in a computer-readable medium, such as a non-transitory computer-readable storage medium containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), a hard disk, optical media, or other computer readable media.

Various examples have been described. These and other examples, including combinations of such examples, are within the scope of the following claims.

The invention claimed is:

1. A lens assembly for a camera, the lens assembly comprising:
    a base portion configured to secure the lens assembly to the camera;
    a first lens mounted to the base portion;
    a lens frame;
    a second lens mounted to the lens frame, the first lens and the second lens positioned co-axially along a central axis extending through both the first lens and the second lens; and
    a linear guide system for the first and second lens comprising:
        a first elongated element and a second elongated element, each of the first elongated element and the second elongated element being elongated along a longitudinal axis extending therethrough and being parallel to and offset from the central axis,
        the lens frame supported by the first elongated element and the second elongated element, the first and second elongated elements supporting and guiding the lens frame for linear movement along a linear path parallel to the central axis, the linear movement along the linear path changing the distance between the first lens and the second lens to adjust the focus position of the lens assembly,
        wherein support of the lens frame by the first and second elongated elements is provided by a fixed connection between the lens frame and one of the first and second elongated elements.

2. The lens assembly of claim 1, wherein the base portion further comprises a first elongated element support and a second elongated element support, each of the first and second elongated element supports extends away from a surface of the base portion, and wherein the first elongated element support has a longitudinal axis that is coaxial with the longitudinal axis of the first elongated element, and wherein the second elongated element support has a longitudinal axis that is co-axial with the longitudinal axis of the second elongated element.

3. The lens assembly of claim 1, wherein the lens assembly further comprises:
    a shield surrounding at least a portion of the second lens, the shield comprising:
        a first aperture extending through the shield from a first surface to a second surface; and
        a second aperture extending through the shield from a first surface to a second surface;
    the lens frame further comprising:
        a first engagement feature coupling the second lens to the first elongated element; and
        a second engagement feature coupling the second lens to the second elongated element;
    wherein the first engagement feature extends through the first aperture, and the second engagement feature extends through the second aperture, and wherein the first and second apertures are formed such that the first engagement feature and the second engagement feature can each travel within their respective apertures along paths parallel to the central axis under a force applied by the motor.

4. The lens assembly of claim 1, wherein the lens assembly is configured to be used with a thermal imaging camera.

5. The lens assembly of claim 1, wherein the lens assembly further comprises a shield having an internal surface surrounding at least a portion of the second lens, wherein at least a portion of the internal surface of the shield comprises geometric features that absorb stray radiation energy.

6. The lens assembly of claim 5, wherein the geometric features comprise grooves.

7. The lens assembly of claim 1, further comprising a motor that moves the second lens along the linear path to change the distance between the first lens and the second lens to adjust the focus position of the lens assembly.

8. The lens assembly of claim 7, wherein the motor comprises a piezo motor.

9. The lens assembly of claim 7, wherein the power of the motor is in the range of 0.5 to 1.0 Watt.

10. The lens assembly of claim 7, wherein the power of the motor is less than 1.0 Watt.

11. The lens assembly of claim 1, wherein the one of the first and second elongated elements is supported for linear movement along the linear path by linear bearings.

12. The lens assembly of claim 11, wherein the fixed connection between the lens frame and the one of the first and second elongated elements is located between two of the linear bearings.

13. The lens assembly of claim 12, wherein the linear bearings are supported by an first elongated element support formed by the base portion, the first elongated element support being elongated in the direction of the linear path.

14. The lens assembly of claim 1, wherein support of the lens frame by one of the first and second elongated elements is provided by a sliding engagement between the lens frame and the one of the first and second elongated elements in the direction of the linear path.

15. The lens assembly of claim 14, wherein the one of the first and second elongated elements remains fixed to the base portion and in sliding engagement with the lens frame.

16. The lens assembly of claim 15, wherein the lens frame includes a semi-circular fork in sliding engagement with the one of the first and second elongated elements.

17. A lens assembly for a camera, the lens assembly comprising:
    a base portion configured to secure the lens assembly to the camera;
    a first lens mounted to the base portion;
    a lens frame;
    a second lens mounted to the lens frame, the first lens and the second lens positioned co-axially along a central axis extending through both the first lens and the second lens;
    a linear guide system for the first and second lens comprising:
        a first elongated element configured to support the lens frame and guide the lens frame for linear movement along a linear path parallel to the central axis, the first elongated element defining a first axis extending centrally therethrough located parallel to and offset from the central axis,
        at least two bearings, wherein at least one of the at least two bearings is fixedly coupled to the base portion, the bearings arranged to support the first elongated element for sliding movement of the first elongated element within the bearings and along the first axis, whereby the first elongated element is movable with respect to the base portion and the at least one bearing, and the linear movement along the linear path changes the distance between the first lens and the second lens to adjust the focus position of the lens assembly, and a rotation restriction element supported by the base portion that restricts rotation of the lens frame around the first axis.

18. The lens assembly of claim 17, wherein the bearings are spaced apart along the first axis, and wherein the lens frame is coupled to the first elongated element at a location on the first elongated element between the two bearings.

19. The lens assembly of claim 17, wherein the bearings are linear bearings.

20. The lens assembly of claim 17, wherein the lens assembly further comprises a motor that engages with the first elongated element to move the second lens along the linear path to change the distance between the first lens and the second lens to adjust the focus position of the lens assembly.

* * * * *